Sept. 5, 1944. W. CONRADT Re. 22,540

INTERNAL COMBUSTION ENGINE

Original Filed Aug. 26, 1943 2 Sheets-Sheet 1

Inventor

Walter Conradt

By Clarence A. O'Brien and Harvey B. Jacobson

Attorneys

Sept. 5, 1944. W. CONRADT Re. 22,540

INTERNAL COMBUSTION ENGINE

Original Filed Aug. 26, 1943 2 Sheets-Sheet 2

Inventor

Walter Conradt

By Clarence A. O'Brien and Harvey B. Jackson

Attorneys

Reissued Sept. 5, 1944

Re. 22,540

UNITED STATES PATENT OFFICE 22,540

INTERNAL-COMBUSTION ENGINE

Walter Conradt, Kenosha, Wis.

Original No. 2,344,496, dated March 21, 1944, Serial No. 500,111, August 26, 1943. Application for reissue May 5, 1944, Serial No. 537,166

4 Claims. (Cl. 123—18)

This invention relates to new and useful improvements in internal combustion engines and more particularly to an engine of the double piston type.

The principal object of the present invention is to provide an internal combustion engine employing a piston assembly which is made up of a pair of coacting pistons, one of which is employed for quick compression and scavenging only.

Other objects and advantages of the invention will become apparent to the reader of the following description.

Figure 2:
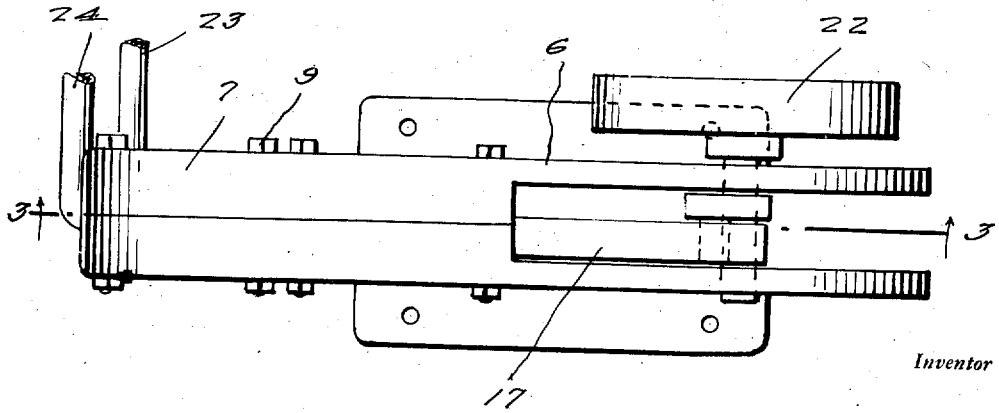
Figure 2 is a top plan view.

Referring to the drawings wherein like numerals designate like parts, it can be seen that the engine includes a case 5 made up of a pair of side walls 6, 6 having inwardly disposed portions 7, 8 at their upper portion which meet as shown in Figure 2. These portions of the walls 6 are bolted together as at 9 and suitable packing means may be provided between the same.

The portions 8 of the walls 6, 6 are suitably formed to accommodate an exhaust valve 10 and an intake valve 11. Between these valves 10, 11 an igniting plug or spark plug 12 is provided.

The inner sides of the portions 8 are straight, while the inner surfaces of the portions 7 are arcuate as denoted by numeral 13 to conform with the curvature of the curved edge portion of an oscillating piston 14 which is supported by trunnions 15 disposed into the side walls 6, 6.

Figure 1:
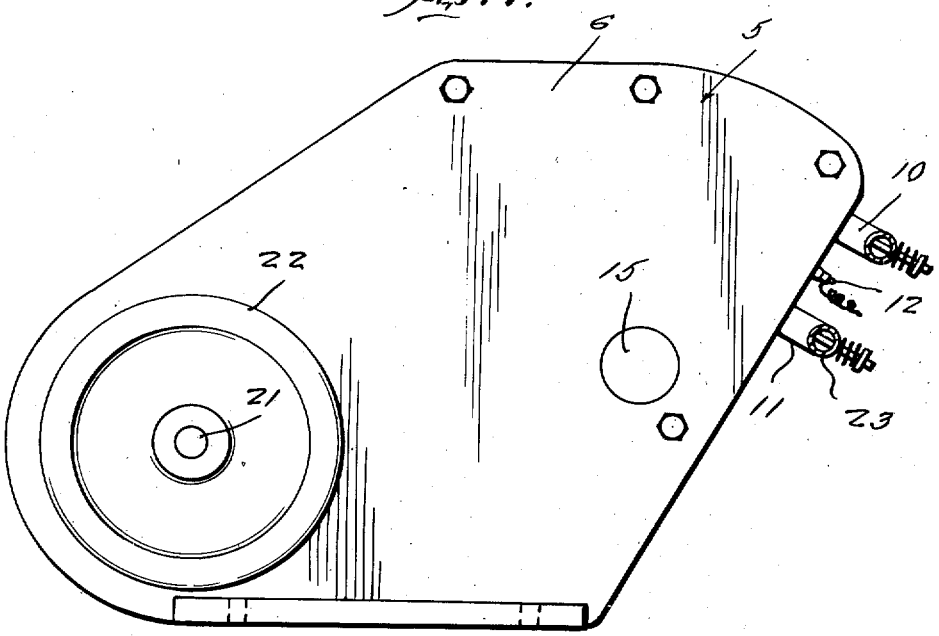
Figure 1 is a side elevational view of the engine.
Figure 4:
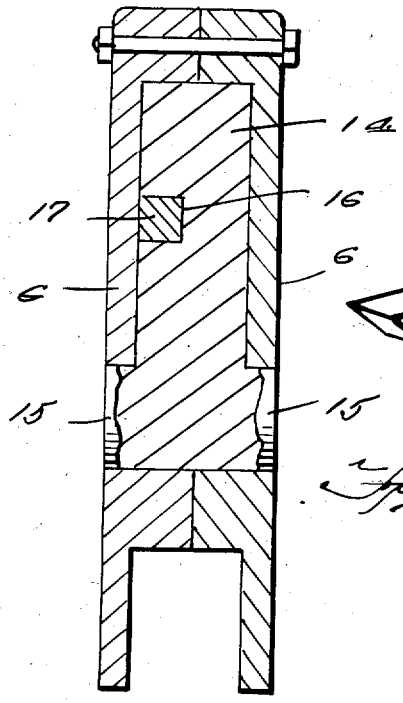
Figure 4 is a transverse vertical section on the line 4—4 of Figure 3.
Figure 5:
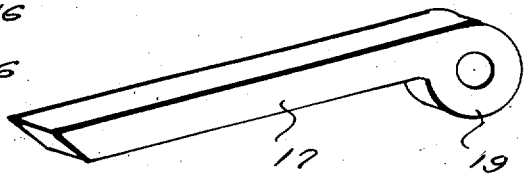
Figure 5 is a perspective view of the power piston.

As clearly shown in Figure 4, the oscillating piston 14 has a cylinder or channel 16 extending entirely across the piston and in this operates a much narrower piston 17 which has a beveled forward end 18 which is substantially parallel to the inner side of the portions 8.

The remaining end of the piston 17 is connected as at 19 to a crank 20 on a crankshaft 21 and which may be provided with a flywheel 22. An intake pipe 23 extends to the valve 11 while an exhaust pipe 24 extends from the valve 10.

Figure 3:
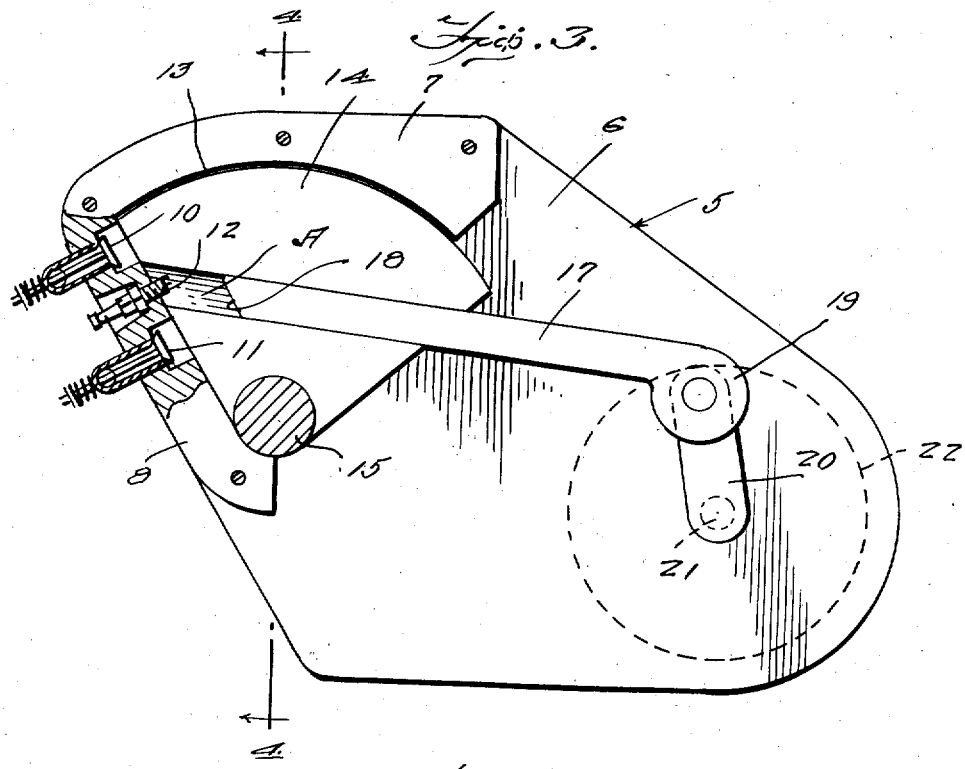
Figure 3 is a section on the line 3—3 of Figure 2.

It can now be seen, that assuming that there is a compressed charge in the chamber A, the spark plug 12 ignites this compressed charge and a piston 17 is driven to the right in Figure 3. Not until the crank 20 has made a substantial movement does the oscillating piston 14 begin to move and this at substantially the end of the power stroke. It is to be understood, of course, that this piston 14 acts in response to the action of the piston 17, merely following the movement of the piston 17. When the piston 17 is at the lowest crank position, the piston 14 will be in open position and on the return stroke of the piston 17 the oscillating piston 14 will operate to scavenge the chamber of burned gases.

The suction stroke takes place just as the explosion stroke, the piston 17 moving to the right, as shown in Figure 3, drawing in fuel through the intake valve 11, as the piston 14 rocks slightly to amplify the space into which fuel can be taken. Then on the return stroke of the piston 17 both the piston 14 and the piston 17 coact to compress the fuel and eventually into the small combustion chamber A.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An engine of the character described comprising a case, a spark plug in the case, exhaust and intake valves in the case, an oscillating piston having a guide-way, an elongated piston operative in the guide-way, a driven shaft including a crank to which the elongated piston is connected, one end of the guide-way serving as a combustion chamber and opposed to which the spark plug is located.

2. An engine of the character described comprising a case, a spark plug in the case, exhaust and intake valves in the case, an oscillating piston having a guide-way, an elongated piston operative in the guide-way, a driven shaft including a crank to which the elongated piston is connected, one end of the guide-way serving as a combustion chamber and opposed to which the spark is located, said oscillating piston being adapted to follow the movements of the elongated piston.

3. An engine of the character described comprising a case, a spark plug in the case, exhaust and intake valves in the case, an oscillating piston having a guide-way, an elongated piston operative in the guide-way, a driven shaft including a crank to which the elongated piston is connected, one end of the guide-way serving as a combustion chamber and opposed to which the spark is located, said oscillating piston being adapted to follow the movements of the elongated piston in compressing and scavenging gases in the case.

4. An engine of the character described comprising a case, a spark plug in the case, exhaust and intake valves in the case, an oscillating piston having a guideway, an elongated piston operative in the guide-way, a driven shaft including a crank to which the elongated piston is connected, one end of the guide-way serving as a combustion chamber and opposed to which the spark plug is located, said elongated piston and oscillating piston being adapted to coact in scavenging and compressing.

WALTER CONRADT.